(12) United States Patent
Nielson et al.

(10) Patent No.: US 10,139,537 B2
(45) Date of Patent: Nov. 27, 2018

(54) MULTIPLE-STACK WIRE GRID POLARIZER

(71) Applicant: Moxtek, Inc., Orem, UT (US)

(72) Inventors: R. Stewart Nielson, Pleasant Grove, UT (US); Shaun Ogden, Saratoga Springs, UT (US); Matt Free, American Fork, UT (US); Bin Wang, Sandy, UT (US); Hua Li, Sandy, UT (US); Brian Bowers, Kaysville, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 15/715,407

(22) Filed: Sep. 26, 2017

(65) Prior Publication Data

US 2018/0143365 A1    May 24, 2018

Related U.S. Application Data

(60) Provisional application No. 62/425,201, filed on Nov. 22, 2016, provisional application No. 62/433,619, filed on Dec. 13, 2016.

(51) Int. Cl.
*G02B 5/30* (2006.01)
*G02B 27/28* (2006.01)
*G02B 1/14* (2015.01)

(52) U.S. Cl.
CPC ......... *G02B 5/3058* (2013.01); *G02B 27/283* (2013.01); *G02B 1/14* (2015.01)

(58) Field of Classification Search
CPC ................ G02B 5/3058; G02B 27/283

USPC ........................ 359/485.05, 487.03
See application file for complete search history.

(56) References Cited

U.S. PATENT DOCUMENTS

| | | | |
|---|---|---|---|
| 6,785,050 B2 | 8/2004 | Lines et al. | |
| 7,570,424 B2* | 8/2009 | Perkins | G02B 5/3058 359/485.05 |
| 7,813,039 B2* | 10/2010 | Perkins | G02B 5/3058 359/485.05 |
| 7,961,393 B2* | 6/2011 | Perkins | G02B 5/3058 359/485.05 |
| 8,027,087 B2* | 9/2011 | Perkins | G02B 5/3058 359/485.05 |
| 9,684,203 B2 | 6/2017 | Nielson et al. | |
| 9,703,028 B2 | 7/2017 | Linford et al. | |
| 2006/0061862 A1 | 3/2006 | Mi et al. | |

(Continued)

OTHER PUBLICATIONS

International search report dated Jan. 12, 2018, in International Application No. PCT/US2017/053953, filed Sep. 28, 2017; 6 pages.

*Primary Examiner* — Ricky D Shafer
(74) *Attorney, Agent, or Firm* — Thorpe, North & Western, LLP

(57) ABSTRACT

A wire grid polarizer (WGP) can have improved performance due to a high aspect ratio (e.g. >3, >5, >10, >15, >20, or >30), where aspect ratio equals T/W, T is a sum of a thickness of wires of the first array 11 plus a thickness of wires of the second array 12 (i.e. $T=Th_{11}+Th_{12}$), and W is a maximum width of wires of the first array 11 and/or of the second array 12. Such high aspect ratio can be achieved with two arrays of wires 11 and 12, each capped by a thin film 01 and 02.

13 Claims, 4 Drawing Sheets

(56) References Cited

U.S. PATENT DOCUMENTS

Figure 1:
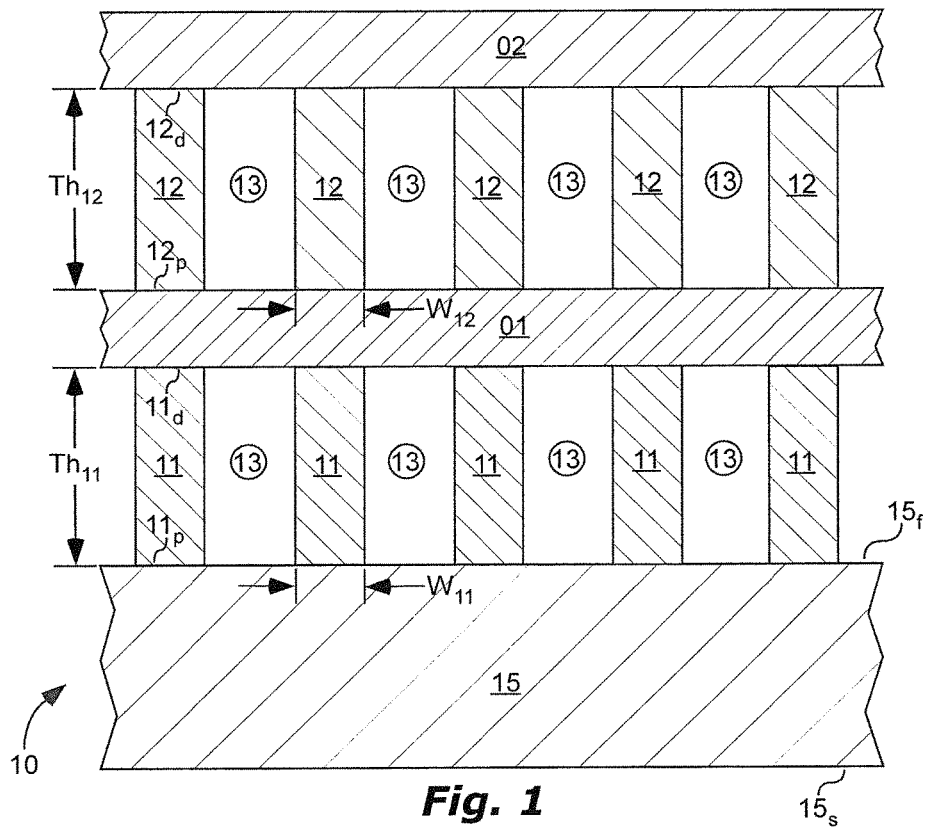

| | | | |
|---|---|---|---|
| 2007/0165307 A1* | 7/2007 | Perkins | G02B 5/3058 359/485.04 |
| 2008/0137188 A1 | 6/2008 | Sato et al. | |
| 2008/0252799 A1* | 10/2008 | Lee | G02B 5/3058 349/5 |
| 2008/0266662 A1* | 10/2008 | Perkins | G02B 5/1814 359/485.05 |
| 2012/0008205 A1 | 1/2012 | Perkins et al. | |
| 2012/0075699 A1 | 3/2012 | Davis et al. | |
| 2012/0176676 A1 | 7/2012 | Sakamoto | |
| 2015/0077851 A1 | 3/2015 | Wang et al. | |
| 2016/0116754 A1* | 4/2016 | Wang | G02B 27/283 359/489.06 |
| 2018/0052270 A1* | 2/2018 | Nielson | G02B 5/3058 |
| 2018/0143364 A1* | 5/2018 | Wang | G02B 27/283 |

* cited by examiner

MULTIPLE-STACK WIRE GRID POLARIZER

CLAIM OF PRIORITY

This application claims priority to US Provisional Patent Application Nos. 62/425,201, filed on Nov. 22, 2016, and 62/433,619, filed on Dec. 13, 2016, which are incorporated herein by reference.

FIELD OF THE INVENTION

The present application is related generally to wire grid polarizers.

BACKGROUND

A wire grid polarizer (WGP) can transmit one polarization (e.g. p-polarization) and reflect or absorb an opposite polarization (e.g. s-polarization). High reflectivity of the opposite polarization (e.g. high Rs) can be important because some applications use both polarized light beams (e.g. s & p). High absorption/low reflectivity of the opposite polarization (e.g. low Rs) can be important in some applications because reflection of this polarization (Rs) can interfere with the optical system. For example, the reflected s-polarization can cause ghosting in an image projector. Some WGPs are designed for high reflection and others for high absorption of the s-polarization.

High transmission of one polarization (e.g. high Tp) can be an important feature of WGPs in order to minimize light-source power requirements. Low transmission of the opposite polarization (e.g. Ts) can be important for improved light image resolution. The quality or performance of WGPs can be shown by efficiency (Tp*Rs) and contrast (Tp/Ts).

Polarization can be improved by increased aspect ratio (wire thickness/wire width) of wires in a wire grid polarizer. Manufacture of wires with a sufficiently large aspect ratio is a difficult manufacturing challenge.

SUMMARY

It has been recognized that it would be advantageous to provide a wire grid polarizer (WGP) with a desired Rs (high or low), high Tp, and low Ts, and a high aspect ratio. The present invention is directed to various embodiments of WGPs that satisfy these needs. Each embodiment may satisfy one, some, or all of these needs.

The WGP can comprise a substrate having a first side and a second side opposite of the first side. A first array of wires, defining a first array, can be located over the first side of the substrate. A first thin film can be located over the first array and can be transparent. A second array of wires, defining a second array, can be located over the first thin film. A second thin film can be located over the second array and can be transparent.

In one embodiment, an aspect ratio can be greater than 5, where aspect ratio=T/W, T is a sum of a thickness of wires of the first array plus a thickness of wires of the second array, and W is a maximum width of wires of the first array and of the second array.

In another embodiment, each wire of the first array can comprise a first absorptive rib and a first reflective rib, the first absorptive rib being sandwiched between the first reflective rib and the substrate; and each wire of the second array can comprise a second absorptive rib and a second reflective rib, the second reflective rib being sandwiched between the second absorptive rib and the second thin film.

In another embodiment, each wire of the first array can comprise a stack of ribs in the following order extending outward from the substrate towards the first thin film: a first transparent rib, a second transparent rib, and a first reflective rib. A material composition of the first transparent rib can be different from a material composition of the second transparent rib. Each wire of the second array can comprise a stack of ribs in the following order extending outward from the first thin film towards the second thin film: a second reflective rib, a third transparent rib, and a fourth transparent rib. A material composition of the fourth transparent rib can be different from a material composition of the third transparent rib.

BRIEF DESCRIPTION OF THE DRAWINGS (DRAWINGS MIGHT NOT BE DRAWN TO SCALE)

FIG. 1 is a schematic, cross-sectional side-view of a wire grid polarizer (WGP) 10 including a substrate 15, a first array 11 over the substrate 15, a first thin film 01 over the first array 11, a second array 12 over the first thin film 01, and a second thin film 02 over the second array 12, in accordance with an embodiment of the present invention.

Figure 2:
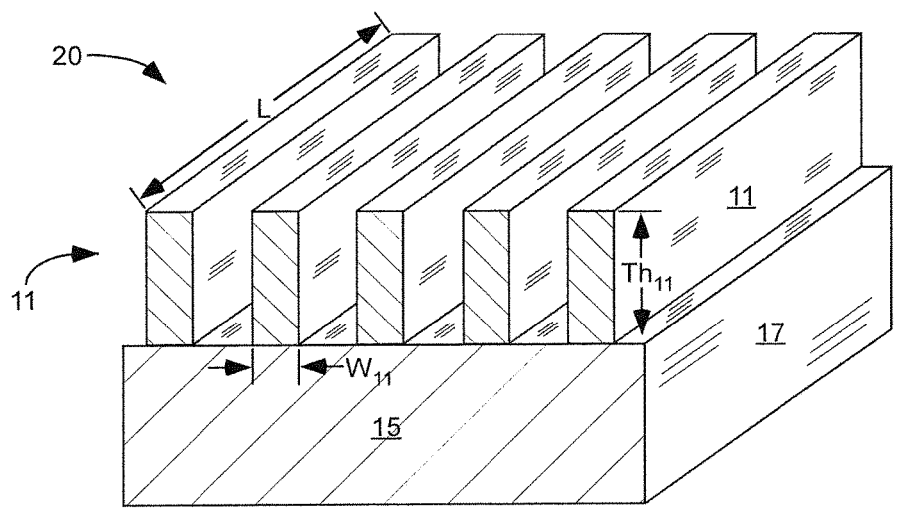

FIG. 2 is a schematic perspective-view of WGP 20, similar to WGP 10 of FIG. 1, including the first array 11 over the substrate 15, in accordance with an embodiment of the present invention.

Figure 3:
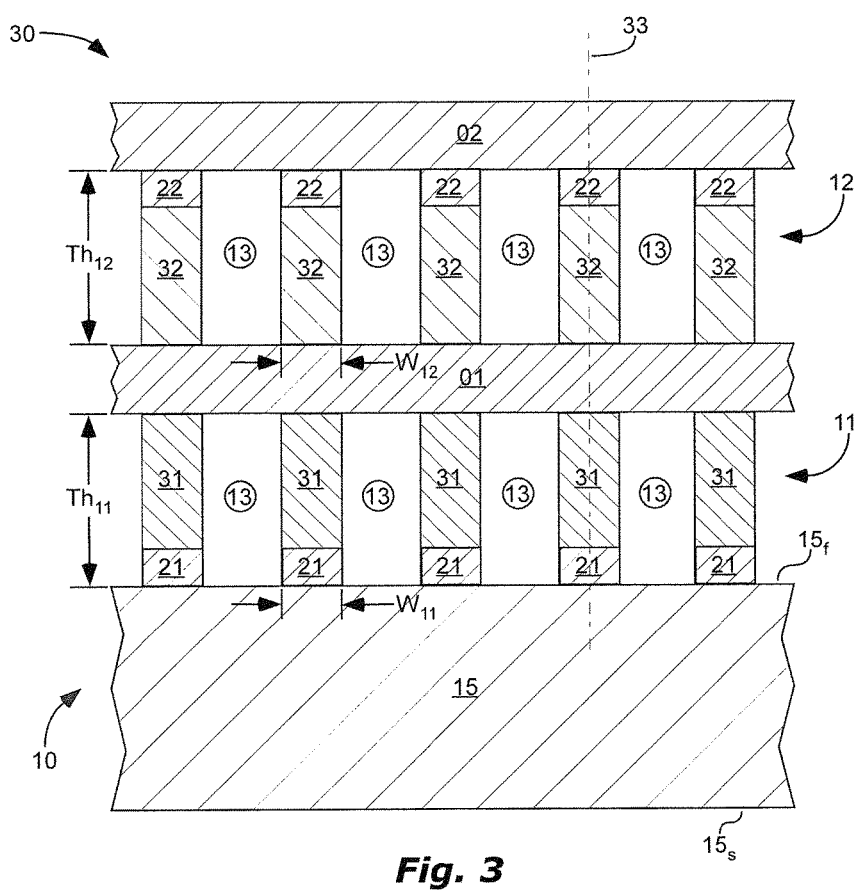

FIG. 3 is a schematic, cross-sectional side-view of WGP 30, similar to WGP 10 of FIG. 1, each wire of the first array 11 can comprise a first absorptive rib 21 and a first reflective rib 31, and each wire of the second array 12 can comprise a second absorptive rib 22 and a second reflective rib 32, in accordance with an embodiment of the present invention.

Figure 4:
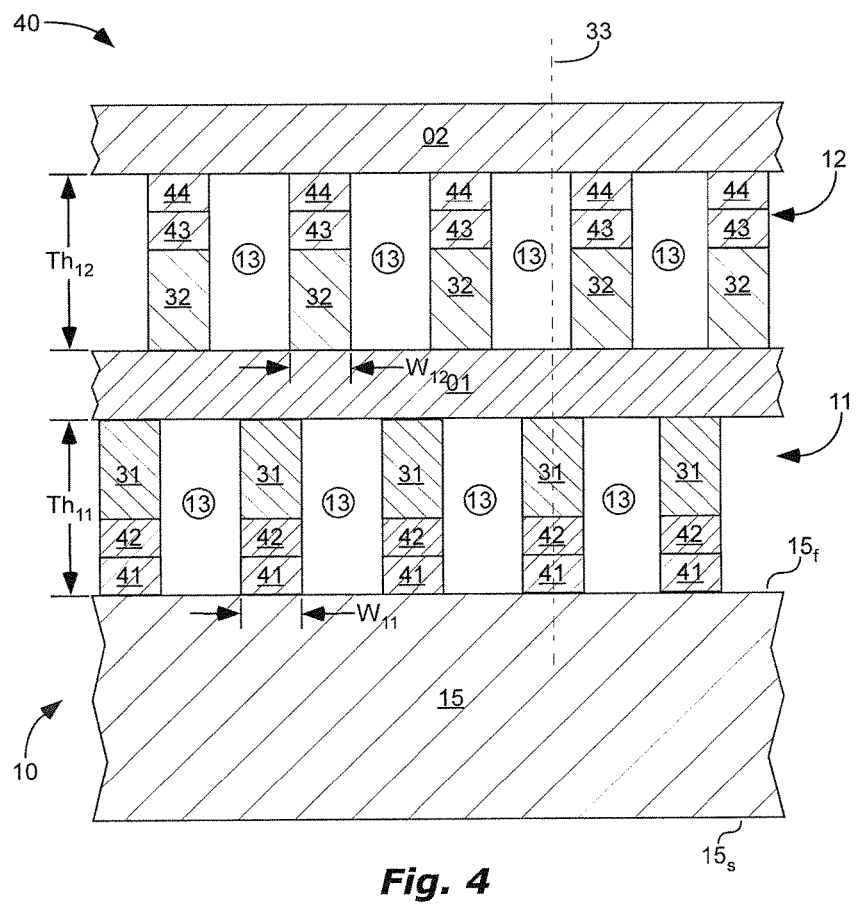

FIG. 4 is a schematic, cross-sectional side-view of WGP 40, similar to WGP 10 of FIG. 1; each wire of the first array 11 can comprise a first transparent rib 41, a second transparent rib 42, and a first reflective rib 31; and each wire of the second array 12 can comprise a second reflective rib 32, a third transparent rib 43, and a fourth transparent rib 44, in accordance with an embodiment of the present invention.

Figure 5:
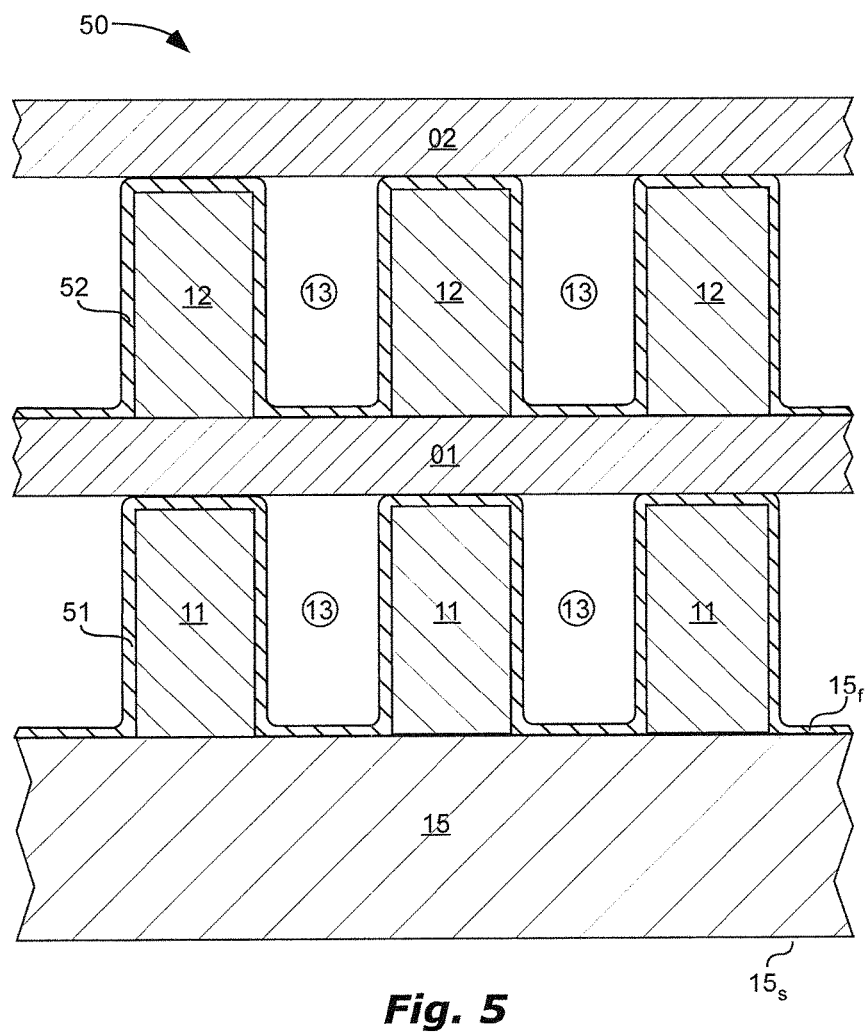

FIG. 5 is a schematic, cross-sectional side-view of WGP 50, similar to WGP 10 of FIG. 1, further comprising a first conformal coating 51 over the first array 11 between the first array 11 and the first thin film 01, and a second conformal coating 52 over the second array 12 between the second array 12 and the second thin film 02, in accordance with an embodiment of the present invention.

DEFINITIONS

As used herein, the term "conformal coating" means a thin film which conforms to the contours of feature topology. For example, "conformal" can mean that a minimum thickness of the coating is greater than 1 nm and a maximum thickness of the coating is less than 20 nm. As another example, "conformal" can mean that a maximum thickness divided by a minimum thickness of the coating is less than 20, less than 10, or less than 5.

As used herein, the term "elongated" means that a length L of the wires is substantially greater than wire width $W_{11}$ or $W_{12}$ or wire thickness $Th_{11}$ or $Th_{12}$ (e.g. L can be at least 10 times, at least 100 times, at least 1000 times, or at least 10,000 times larger than wire width $W_{11}$ or $W_{12}$ and/or wire thickness $Th_{11}$ or $Th_{12}$).

As used herein, the terms "on", "located on", "located at", and "located over" mean located directly on or located over with some other material between. The terms "located directly on", "adjoin", "adjoins", and "adjoining" mean direct and immediate contact with no other solid material between.

As used herein, the term "nm" means nanometer(s) and the term "μm" means micrometer(s).

As used herein, the term "parallel" means exactly parallel, parallel within normal manufacturing tolerances, or nearly parallel, such that any deviation from exactly parallel would have negligible effect for ordinary use of the device.

As used herein, the term "substrate" means a base material, such as for example a glass wafer. The term "substrate" also includes multiple materials, such as for example a glass wafer with thin film(s).

As used herein, the term "thin film" means a continuous layer that is not divided into a grid and having a thickness less than 10 μm, less than 1 μm, or less than 0.5 μm, depending on the light spectrum of interest.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a specific wavelength range (e.g. ultraviolet, visible, or infrared spectrum) and can have a different property in a different wavelength range. Such materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2} \quad \text{Equation 1}$$

Unless explicitly specified otherwise herein, materials with k≤0.1 in the specified wavelength range are "transparent" materials, materials with k>0.1 and R≤0.6 in the specified wavelength range are "absorptive" materials, and materials with k>0.1 and R>0.6 in the specified wavelength range are "reflective" materials.

DETAILED DESCRIPTION

As illustrated in FIG. 1, a wire grid polarizer (WGP) 10 is shown comprising a substrate 15 having a first side $15_f$ and a second side $15_s$ opposite of the first side $15_f$. The substrate 15 can be transparent. A first array of wires, defining a first array 11, can be located over the first side $15_f$ of the substrate 15 with a proximal end $11_p$ closer to the substrate 15 and a distal end $11_d$ farther from the substrate 15. The first array 11 can be parallel and elongated, with channels 13 between adjacent wires. A first thin film 01 can be located at the distal end $11_d$ of the first array 11 and can be transparent. A second array of wires, defining a second array 12, can be located over the first thin film 01 with a proximal end $12_p$ closer to the first thin film 01 and a distal end $12_d$ farther from the first thin film 01. The second array 12 can be parallel and elongated, with channels 13 between adjacent wires. A second thin film 02 can be located at the distal end $12_d$ of the second array 12 and can be transparent.

The first array 11 can adjoin the substrate 15 and/or the first thin film 01, or other material can be located therebetween. The second array 12 can adjoin the first thin film 01 and/or the second thin film 02, or other material can be located therebetween.

In one embodiment, material of the first array 11 and material of the second array 12 can be reflective. In another embodiment, material(s) of the first array 11 and material(s) of the second array 12 can be a reflective, transparent, absorptive, or combinations thereof.

As shown in FIGS. 3 and 4, a plane 33 can pass through a center of a wire of the first array 11 and can be perpendicular to the first side 15 of the substrate 15. As shown in FIG. 3, the wire of the first array 11 can be aligned with an associated wire of the second array 12 such that the plane 33 also passes through the associated wire of the second array 12, and can even pass through a center of the associated wire of the second array 12. Alternatively, as shown in FIG. 4, wires of the first array 11 and wires of the second array 12 may be misaligned or offset so that the plane does not pass through the associated wire of the second array 12. A decision of whether or not to so align wires of the first array 11 and wires of the second array 12 can be made depending on the effect of such alignment/misalignment compared with manufacturing difficulties.

The first thin film 01 and the second thin film 02 can be formed by various methods, including sputter deposition. Sputtering can result in covering tops of the arrays of wires 11 and 12 without filling the channels 13. The first thin film 01 can span the channels 13 while covering the distal ends $11_d$ of the first array 11 and the second thin film 02 can span the channels 13 while covering the distal ends $12_d$ of the second array 12. Thus, the channels 13 can be adjacent to the wires and can be air filled, and degradation of WGP performance from solid-filled channels 13 can be avoided. See for example USA Patent Publication Number US 2012/0075699, which is incorporated herein by reference. Use of sputtering and the method described in US 2012/0075699 can result in continuous thin films unbroken by boundary layers. Thus, the first thin film 01 can extend across the first array 11 unbroken by any boundary layer extending parallel to the first array 11 and the second thin film 02 can extend across the second array 12 unbroken by any boundary layer extending parallel to the second array 12. In contrast, shadow deposition can result in boundary layers running parallel with the wires.

An alternative to sputtering and the thin films 01 and 02 spanning the channels 13 is filling the channels 13. Thus, the channels 13 can be filled with material of the first thin film 01 and the second thin film 02, such as for example by atomic layer deposition.

An aspect ratio can be based on a combined thickness $Th_{11}$ and $Th_{12}$ of both arrays of wires 11 and 12 divided by wire width $W_{11}$ or $W_{12}$ (whichever is greater). With present manufacturing abilities, the combined thickness $Th_{11}$ and $Th_{12}$ of both arrays of wires 11 and 12 can be greater than a thickness of a single array. Therefore, a much larger effective aspect ratio may be achieved with stacked, multiple arrays. Although two arrays of wires 11 and 12 are shown in the drawings, an even higher effective aspect ratio may be achieved by a third, fourth, or even more arrays of wires stacked above the substrate with an intermediate thin film. For example, an aspect ratio can be greater than 3, greater than 5, greater than 10, greater than 15, greater than 20, or greater than 30, where aspect ratio=T/W. T is a sum of a thickness of wires of the first array 11 plus a thickness of wires of the second array 12 (i.e. $T=Th_{11}+Th_{12}$). Unless specified otherwise, W is a maximum width of wires of the first array 11 and of the second array 12 (i.e. maximum of $W_{11}$ and $W_{12}$). Alternatively, if so specified, W is a maximum width of wires of the first array 11 or of the second array 12 (i.e. maximum of $W_{11}$ or $W_{12}$).

WGP 30, shown in FIG. 3, is a variation of WGP 10. Each wire of the first array 11 can comprise a first absorptive rib 21 and a first reflective rib 31. The first absorptive rib 21 can be sandwiched between the first reflective rib 31 and the substrate 15. Each wire of the second array 12 can comprise a second absorptive rib 22 and a second reflective rib 32. The second reflective rib 32 can be sandwiched between the second absorptive rib 22 and the second thin film 02.

This WGP 30 can absorb a polarization of light from each of two opposite sides of the WGP 30, which can be advantageous in image projection systems. For example, in one embodiment, the WGP 30, in a light wavelength range of 450 nm through 700 nm, can absorb at least 80% of one polarization of light from both sides of the WGP 30 and can transmit at least 80% of an opposite polarization of light. Advantages of the design of WGP 30 are also described in U.S. Pat. No. 9,684,203, which is incorporated herein by reference.

WGP 40, shown in FIG. 4, is a variation of WGP 10. Each wire of the first array 11 can comprise a stack of ribs in the following order extending outward from the substrate 15 towards the first thin film 01: a first transparent rib 41, a second transparent rib 42, and a first reflective rib 31. A material composition of the first transparent rib 41 can be different from a material composition of the second transparent rib 42. Each wire of the second array 12 can comprise a stack of ribs in the following order extending outward from the first thin film 01 towards the second thin film 02: a second reflective rib 32, a third transparent rib 43, and a fourth transparent rib 44. A material composition of the fourth transparent rib 44 can be different from a material composition of the third transparent rib 43.

Performance of WGP 40 can be improved if an index of refraction of the first transparent rib (n1) is greater than an index of refraction of the second transparent rib (n2) and an index of refraction of the fourth transparent rib (n4) is greater than an index of refraction of the third transparent rib (n3). This relationship between the indices of refraction n1-n4 can be across a wavelength range of intended use, such as for example across a wavelength range of at least 100 nm, 200 nm, 300 nm, or 400 nm in the ultraviolet, visible, or infrared spectrums of light.

Performance of WGP 40 can be improved, particularly in uniformity of efficiency and contrast from each of two opposite sides of the WGP 40, if a material composition of the first transparent rib 41 is the same as a material composition of the fourth transparent rib 44 and if a material composition of the second transparent rib 42 is the same as a material composition of the third transparent rib 43.

One example of possible performance of WGP 40 is that a percent reflection of one polarization of incident light on the first side $15_f$ of the substrate 15 (Rs1) is greater than 93% and a percent reflection of one polarization of incident light on the second side $15_s$ of the substrate 15 (Rs2) is greater than 93%. Such performance can be across a wavelength range of intended use, such as for example across a wavelength range of at least 100 nm, 200 nm, 300 nm, or 400 nm in the ultraviolet, visible, or infrared spectrums of light.

WGP 40 can have high efficiency (Rs*Tp) and high contrast (Tp/Ts) on each of two opposite sides of the WGP 40. Advantages of the design of WGP 40 are also described in USA Provisional Patent Application No. U.S. 62/425,201, filed on Nov. 22, 2016, which is incorporated herein by reference.

WGP 50, shown in FIG. 5, is a variation of WGP 10. WGP 50 includes a first conformal coating 51 over the first array 11, coating sides of wires of the first array 11, a distal end $12_d$ of wires of the first array 11 between the first array 11 and the first thin film 01, and an exposed surface of the first side $15_f$ of the substrate 15. WGP 50 also includes a second conformal coating 52 over the second array 12, coating sides of wires of the second array 12, a distal end $12_d$ of wires of the second array 12 between the second array 12 and the second thin film 02, and an exposed surface of the first thin film 01. The conformal coatings 51 and 52 can protect the wires 11 and 12, as described in U.S. Pat. No. 6,785,050 and U.S. Pat. No. 9,703,028.

What is claimed is:

1. A wire grid polarizer (WGP) comprising:
    a substrate having a first side, having a second side opposite of the first side, and being transparent;
    a first array of wires, defining a first array, located over the first side of the substrate with a proximal end closer to the substrate and a distal end farther from the substrate, the first array being parallel and elongated, with channels between adjacent wires;
    a first thin film located at the distal end of the first array and being transparent;
    a second array of wires, defining a second array, located over the first thin film with a proximal end closer to the first thin film and a distal end farther from the first thin film, the second array being parallel and elongated, with channels between adjacent wires;
    a second thin film located at the distal end of the second array and being transparent; and
    an aspect ratio being greater than 5, where aspect ratio=T/W, T is a sum of a thickness of wires of the first array plus a thickness of wires of the second array, and W is a maximum width of wires of the first array and of the second array.

2. The WGP of claim 1, wherein the channels are adjacent to the wires and the channels are air filled.

3. The WGP of claim 1, wherein the aspect ratio is greater than 10.

4. The WGP of claim 1, wherein the aspect ratio is greater than 20.

5. The WGP of claim 1, wherein:
    each wire of the first array comprises a first absorptive rib and a first reflective rib, the first absorptive rib being sandwiched between the first reflective rib and the substrate; and
    each wire of the second array comprises a second absorptive rib and a second reflective rib, the second reflective rib being sandwiched between the second absorptive rib and the second thin film.

6. The WGP of claim 5, wherein the WGP, in a light wavelength range of 450 nm through 700 nm, is capable of absorbing at least 80% of one polarization of light from both sides of the WGP and transmitting at least 80% of an opposite polarization of light.

7. The WGP of claim 1, wherein:
    each wire of the first array comprises a stack of ribs in the following order extending outward from the substrate towards the first thin film: a first transparent rib, a second transparent rib, and a first reflective rib;
    a material composition of the first transparent rib is different from a material composition of the second transparent rib;
    each wire of the second array comprises a stack of ribs in the following order extending outward from the first thin film towards the second thin film: a second reflective rib, a third transparent rib, and a fourth transparent rib; and
a material composition of the fourth transparent rib is different from a material composition of the third transparent rib.

8. The WGP of claim 7, wherein for a wavelength range of at least 100 nm in a visible spectrum of light an index of refraction of the first transparent rib (n1) is greater than an index of refraction of the second transparent rib (n2) and an index of refraction of the fourth transparent rib (n4) is greater than an index of refraction of the third transparent rib (n3).

9. The WGP of claim 7, wherein:
a material composition of the first transparent rib is the same as a material composition of the fourth transparent rib; and
a material composition of the second transparent rib is the same as a material composition of the third transparent rib.

10. The WGP of claim 7, wherein for a wavelength range of at least 100 nm in a visible spectrum of light, a percent reflection of one polarization of incident light on the first side of the substrate (Rs1) is greater than 93% and a percent reflection of one polarization of incident light on the second side of the substrate (Rs2) is greater than 93%.

11. The WGP of claim 1, wherein:
the first thin film extends across the first array unbroken by any boundary layer extending parallel to the first array; and
the second thin film extends across the second array unbroken by any boundary layer extending parallel to the second array.

12. The WGP of claim 1, further comprising
a first conformal coating over the first array, coating sides of wires of the first array, distal ends of wires of the first array between the first array and the first thin film, and an exposed surface of the first side of the substrate; and
a second conformal coating over the second array, coating sides of wires of the second array, distal ends of wires of the second array between the second array and the second thin film, and an exposed surface of the first thin film.

13. The WGP of claim 1, wherein material of the first array and of the second array is reflective.

* * * * *